US010244390B2

(12) United States Patent
Call et al.

(10) Patent No.: US 10,244,390 B2
(45) Date of Patent: Mar. 26, 2019

(54) SECURE KEY FOB

(71) Applicant: Vivint, Inc., Provo, UT (US)

(72) Inventors: Wayne Call, Alpine, UT (US); Craig DeVries, Bountiful, UT (US); Jeremy B. Warren, Draper, UT (US); Michael D. Child, Lehi, UT (US)

(73) Assignee: Vivint, Inc., Provo, UT (US)

( * ) Notice: Subject to any disclaimer, the term of this patent is extended or adjusted under 35 U.S.C. 154(b) by 194 days.

(21) Appl. No.: 14/885,615

(22) Filed: Oct. 16, 2015

(65) Prior Publication Data

US 2017/0111787 A1 Apr. 20, 2017

(51) Int. Cl.
*H04L 29/06* (2006.01)
*H04W 12/04* (2009.01)
*H04L 9/08* (2006.01)
*H04W 12/06* (2009.01)
*H04L 9/32* (2006.01)

(52) U.S. Cl.
CPC .......... *H04W 12/04* (2013.01); *H04L 9/0816* (2013.01); *H04L 9/0891* (2013.01); *H04L 9/3236* (2013.01); *H04L 63/062* (2013.01); *H04W 12/06* (2013.01); *H04L 2209/80* (2013.01)

(58) Field of Classification Search
CPC ............................. H04W 12/04; H04L 9/0816
USPC ......................................................... 380/270
See application file for complete search history.

(56) References Cited

U.S. PATENT DOCUMENTS

| 6,286,102 | B1* | 9/2001 | Cromer | G06F 21/88 726/16 |
| 6,377,173 | B1 | 4/2002 | Desai | |
| 6,484,260 | B1* | 11/2002 | Scott | G06F 21/32 713/182 |
| 6,960,990 | B2 | 11/2005 | McKibbon | |
| 7,174,017 | B2 | 2/2007 | Bantz et al. | |
| 7,988,038 | B2 | 8/2011 | Beenau et al. | |
| 8,102,999 | B2 | 1/2012 | Corndorf | |
| 8,730,029 | B2 | 5/2014 | Petricoin, Jr. | |
| 8,971,854 | B2 | 3/2015 | Addy et al. | |
| 9,141,150 | B1 | 9/2015 | Trundle et al. | |
| 2005/0135616 | A1 | 6/2005 | Dellow et al. | |
| 2007/0279184 | A1 | 12/2007 | Desai et al. | |
| 2008/0107274 | A1 | 5/2008 | Worthy | |
| 2008/0271123 | A1 | 10/2008 | Ollis et al. | |
| 2009/0022315 | A1 | 1/2009 | Leung | |

(Continued)

FOREIGN PATENT DOCUMENTS

EP     0700185     3/1996

OTHER PUBLICATIONS

PCT International Search Report for PCT International Application No. PCT/US2017/016651, dated May 30, 2017 (3 pp.).

(Continued)

*Primary Examiner* — Anthony D Brown
(74) *Attorney, Agent, or Firm* — Holland & Hart LLP

(57) ABSTRACT

Systems, apparatuses, and methods relating to operating a security system are described. In one embodiment a method may include receiving at a receiving unit a protected signal sent from a portable transmitter, the receiving unit in communication with a security system panel, assessing at least one characteristic of the protected signal, modifying at least one characteristic of the protected signal based at least in part on the assessing, and comparing the protected signal to a stored signal after the modifying.

25 Claims, 10 Drawing Sheets

(56) References Cited

U.S. PATENT DOCUMENTS

| | | |
|---|---|---|
| 2013/0243265 A1 | 9/2013 | Langen |
| 2014/0118120 A1 | 5/2014 | Chen et al. |
| 2014/0215567 A1* | 7/2014 | Yoshizawa ............ H04W 12/06 726/3 |
| 2015/0048924 A1 | 2/2015 | Feldstein et al. |
| 2015/0116109 A1 | 4/2015 | Fadell et al. |
| 2015/0161370 A1 | 6/2015 | North et al. |
| 2015/0279134 A1 | 10/2015 | Warren |
| 2015/0293509 A1 | 10/2015 | Bankowski et al. |
| 2017/0018128 A1* | 1/2017 | Berezin ............... G07C 9/00111 |

OTHER PUBLICATIONS

PCT International Search Report for International Application No. PCT/US2016/055141, dated Jan. 18, 2016 (3 pp.).

* cited by examiner

SECURE KEY FOB

BACKGROUND

The following relates to improving security of portable electronic transmitters often used in home automation and/or security system applications. Currently, many security and automation systems use triggering mechanisms as a way to initiate or trigger system changes. In general, however, these triggering mechanisms broadcast out in the open without any signal protection from calculated, malicious attackers. These attackers often potentially sift or replicate the triggering mechanism's signals—such as a "disarm" signal—replicate the signal, and then employ a counterfeit triggering mechanism. This counterfeit triggering mechanism allows the attacker to effectively bypass the security or the automation system protection by counterfeiting the signal and remaining undetected.

The inventors produced solutions to the above-highlighted problems by creating new ways for a secure portable transmitter—including key fobs—and associated communications. In some embodiments the inventors' solutions include using specifically designed encryption algorithms using keys, authentication algorithms using secret information, and/or changing and/or rotating certain information as a way to prevent these malicious attack on conventional "out in the open" signals.

SUMMARY

According to at least one embodiment a computer-implemented method for operating a security system is described. In some embodiments the method may include receiving at a receiving unit a protected signal sent from a portable transmitter, the receiving unit in communication with a security system panel, assessing at least one characteristic of the protected signal, modifying at least one characteristic of the protected signal based at least in part on the assessing, and/or comparing the protected signal to a stored signal after the modifying.

In some embodiments the protected signal may include an encrypted signal having a key. In some embodiments modifying the protected signal may include decrypting the encrypted signal.

In some embodiments the protected signal may include an authentication signal having a secret. In some embodiments modifying the protected signal may include authenticating the authentication signal and/or the authentication signal may include a hash.

In some embodiments the protected signal may include an encrypted signal and/or the encrypted signal may include at least a portion of the authentication signal.

In some embodiments modifying the protected signal may include decrypting the encrypted signal received at the receiving unit and/or authenticating the authentication signal received at the receiving unit. In some embodiments the sending unit may include a key fob.

In some embodiments the method may include changing one or more characteristics of the protected signal based at least in part on a first input and changing one or more characteristics of the stored signal based at least in part on the first input.

In some embodiments the first input may include a user input. In some embodiments the first input may include a number of times the user input has been received. In some embodiments the first input may include a number of times the first input has been changed.

In some embodiments the one or more characteristics of the protected signal may include a key. In some embodiments at least one of the one or more characteristics of the protected signal and the one or more characteristics of the stored signal can be changed randomly. In some embodiments at least one of the one or more characteristics of the protected signal and the one or more characteristics of the stored signal can be changed pseudo-randomly. In some embodiments the method may include changing at least one of the protected signal and the stored signal based at least in part on a number of times the receiving unit has received one or more protected signals.

In some embodiments the method may include electronically linking the receiving unit to the portable transmitter. In some embodiments the linking may be based at least in part on a proximity of the receiving unit and the portable transmitter.

According to at least one embodiment an apparatus for operating a security system is described. In some embodiments the apparatus may include a receiving unit having a receiver in communication with a security system panel, at least one processor, memory in electronic communication with the at least one processor, and/or instructions stored in the memory. In some embodiments the instructions being executable by the at least one processor may include to receive at a receiving unit a protected signal sent from a portable transmitter, assess at least one characteristic of the protected signal, modify at least one characteristic of the protected signal based at least in part on the assessing, and/or compare the protected signal to a stored signal after the modifying.

According to at least one embodiment a non-transitory computer-readable storage medium storing computer executable instructions is described. In some embodiments the computer executable instructions when executed by a processor may cause the processor to receive at a receiving unit a protected signal sent from a portable transmitter, assess at least one characteristic of the protected signal, modify at least one characteristic of the protected signal based at least in part on the assessing, and/or compare the protected signal to a stored signal after the modifying.

In some embodiments the computer executable instructions may include changing one or more characteristics of the protected signal based at least in part on a number of events. In some embodiments the protected signal may include at least one of an encrypted signal having a key and an authentication signal having a secret.

BRIEF DESCRIPTION OF THE DRAWINGS

The accompanying drawings illustrate a number of exemplary embodiments. These drawings are incorporated as part of this disclosure. Together with the following description, these drawings demonstrate and explain various principles of the disclosure. These drawings do not limit the disclosure in any way and should not be construed as such—only serving as exemplary depictions.

Figure 1:
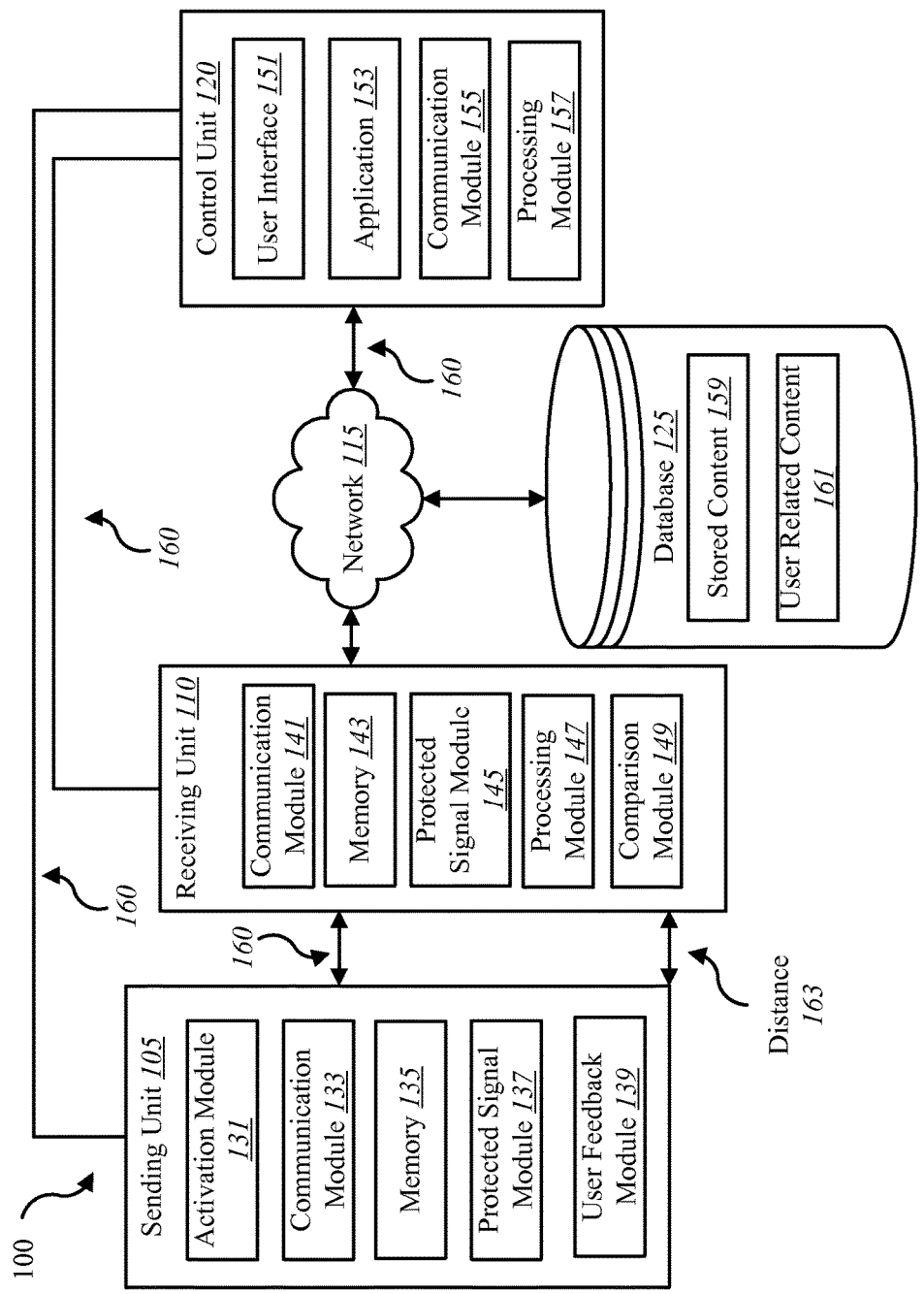
FIG. 1 depicts a block diagram of exemplary systems and methods suitable for implementing the present systems and methods.

While the embodiments described here are susceptible to various modifications and alternative forms, specific embodiments have been shown merely by example in the drawings and are described in detail. The exemplary embodiments described, however, are not limited to the particular forms, details, structures, or other characteristics disclosed. Rather, this disclosure covers all modifications, equivalents, and alternatives falling within the scope of the appended claims.

DETAILED DESCRIPTION

Some embodiments relate to systems, methods, and related devices for enhancing security and home automation system components and communications. A main problem in security and home automation systems is using system triggering mechanisms without having adequate ways to protect the communication between the triggering mechanism and the system and/or other associated devices. In some instances, malicious individuals may counterfeit the signals and/or operations of the triggering mechanism and/or the system. Current systems only employ out-in-the-open triggering mechanisms and communications—unprotected from these malicious attackers. These attackers can potentially replicate the signals, create a counterfeit, and bypass the security systems unnoticed. This creates potentially catastrophic security breaches by the malicious actors. The inventors, however, provide multiple solutions to this problem.

In some embodiments the portable transmitter, such as a key fob, may include a specifically-designed encryption procedure. This encryption procedure may incorporate using an electronic "key." In some embodiments, the encryption information (and potentially associated decryption information) are transmitted to a receiving unit, which may include and/or be in communication with a home security system panel. In some embodiments, one or more devices such as the receiving unit decrypts the encrypted signal and then compares the information in the now-decrypted signal with information accessible by one or more devices associated with the system—including the panel and/or the network.

In some embodiments the portable transmitter may include authentication procedures and protocols—including the use of "secret" information. In some embodiments, the authentication information including the secret information is transmitted to a receiving unit. When the authentication is received at the received unit, the system may need to perform additional processes to access the authentication information.

In some embodiments authentication information—sometimes stored as a "hash"—may also be encrypted. Thus, to access the authentication information the protected signal may need to be decrypted first. After this decryption, the system may need to then authenticate the signal received, including the secret information. In essence, this provides a two-tiered protection system that will be even more secure from the malicious attacks attempting to counterfeit these signals. In some embodiments decryption, authentication, and/or other related steps may be performed simultaneously, in parallel, and/or in series.

Third, in some embodiments the key fob may include changing some portion of the encryption, authentication, and/or other information after a certain number of "events," such as arming or disarming the system. In some embodiments the changing may occur randomly or pseudo-randomly. In some embodiments this changing may be rotating certain characteristics, such as the electronic "key" or the "secret" information. In other embodiments this changing may be creating entirely new characteristics, such as a new electronic "key" or new "secret." In some embodiments this changing may be based on a certain number of events. In some embodiments this changing may be performed pseudo-randomly such that one or both of a sending unit and a receiving unit will anticipate the correct information to be sent and received—allowing for the units to be synced and secure.

In some embodiments involving changing or rotating information, the inventors have designed solutions using a specific number of triggering "events." In some instances, using 12 triggering events becomes advantageous, particularly when using certain encryption or authentication characteristics—such as the number of bits of the information. In some instances, the key may be 128-bit, so for each of the 12 events the system may use ¼ of the 128-bits—effectively meaning that for every 12 events only 3 full sets of the 128-bits would be used.

In other embodiments, the portable transmitter and other devices may have additional protection requirements. As one example, the key fob and/or the security system panel may have restrictions regarding encryption, authentication, changing characteristics, and/or other characteristics. For instance, the security system via the panel may require that the portable transmitter be positioned within a certain distance (e.g., 100, 50, 10, 5, 3, or 2 meters) in order for one or more of decryption, authentication, changing, and/or other characteristics to function. This provides an additional level of physical protection against malicious attackers attempting to acquire security related information and create a counterfeit key fob—but who cannot gain entry to the structure without forcible entry.

The inventors' designed and anticipate these solutions to be used separately or in a variety of combinations. For example, some portable transmitters like key fobs—may include capabilities related to both encryption and authentication. Others may include capabilities related to encryption and pseudo-randomly changing certain information based on a number of events. Or, in other embodiments, the portable transmitters may include capabilities related to using multiple solutions at different times or at the same time—based at least in part on one or more various parameters. In some embodiments using certain combinations of these solutions may be based on one or more triggered events—such as a perceived attempted breach of the security system. For example, based on an attempted breach, a portable transmitter that only initially utilized encryption may then also employ authentication and/or changing certain information. The system may be configured this way to provide additional security protocols based at least in part on any triggering event.

In some embodiments a sending unit may include a portable transmitter. In some embodiments a portable transmitter may include a key fob. In some embodiments a sending unit may include but not is not limited to a key fob, a mobile phone, a wearable electronic device (e.g., a fit bit), a pda, a tablet, a portable computing device, etc.

In some embodiments system 100 may perform one or more operations automatically based on receiving one or more inputs including, but not limited to, inputs related to a protected a signal, encryption, authentication, a key, a secret, a key serial number, and/or others. In some embodiments system 100 may permit a user to manually trigger one or more actions, including those related to a protected signal such as transmitting, receiving, decrypting, authentication, changing, modifying, comparing, and/or other actions disclosed in this disclosure.

In some embodiments, the secure key fob may employ different modes. These different modes may include one or more secure modes and/or one or more legacy modes. The one or more secure modes may include a highly protected mode requiring additional protocols and steps—relating to the protected signal itself and also not relating to the protected signal. In some embodiments the one or more legacy modes can be used with certain specific hardware. In some embodiments, the key fob may provide specific audio, visual, and/or tactile information to notify the user of the mode and whether such a mode has been started and/or altered.

Any discussion of any apparatus, system, method, and/or any other characteristic discussed with respect to one element (e.g., system 100) is not limiting and applies to every other discussion of that same element (e.g., system 100), same element type (e.g., another system), and/or any other element type (e.g., another device and/or method).

FIG. 1 is a block diagram illustrating one embodiment of a system 100 in which the present systems and methods may be implemented. In some embodiments the systems and methods described here may be performed in relation to on one or more devices illustrated in system 100. The system 100 may include sending unit 105, receiving unit 110, control unit 120, database 125, and/or network 115 that allows sending unit 105, receiving unit 110, control unit 120, and/or database 125 to communicate with one another—directly between any of the components, indirectly through one or more intermediate components, and/or some combination of both.

Although elements of sending unit 105, receiving unit 110, control unit 120, and/or database 125 may be depicted as being internal to the respective components, it is understood that one or more of the elements may be external to each component and may be connected to one or more respective components (e.g., 105, 110, 115, 120, and/or 125) through one or more wired and/or wireless connections.

Sending unit 105 may include an activation module 131, communication module 133, memory 135, protected signal module 137, and/or user feedback module 139. Sending unit 105 may connect to receiving unit 110 using a connection 160. Connection 160 may include a wired connection, a wireless connection, and/or both. In some embodiments connection 160 may facilitate communication, transmission, encryption, authentication, and/or changing certain signal characteristics, among other things.

In some embodiments sending unit 105 may include an activation module 131. This activation module 131 may include any button, switch, knob, toggle, lever, regulator, actuator, and/or other device for activating. In some embodiments activation module 131 may activate sending unit 105, receiving unit 110, network 115, control unit 120, and/or database 125. In some embodiments this activation module 131 may be actuated by a user electronically, manually, and/or physically, including being actuated by the user's hand. In some embodiments this activation module 131 may be actuated based at least in part on one or more inputs, such as a system 100 input, that may send a signal from the activation module 131 to another module of sending unit 105.

In some embodiments sending unit 105 may include communication module 133. This communication module 133 may facilitate communication between sending unit 105 and other components of system 100, including but not limited to receiving unit 110, network 115, control unit 120, and/or database 125. In some embodiments communication module may facilitate communication between sending unit 105 and elements of other system elements, such as communication module 141, communication module 155, and/or stored content 159, among others. In some embodiments communication module may facilitate communication via one or more connections 160. In some embodiments communication module may facilitate communication via one or more wired and/or wireless connections.

In some embodiments communication module 133 may generate a notification and/or a transmission in response to receiving a signal from one or more other modules, including but not limited to activation module 131, memory 135, protected signal module 137, user feedback module 139, and/or other components or elements of system 100. This notification and/or transmission may be sent to one or more components and/or elements of system 100.

In some embodiments sending unit 105 may communicate through communication module 133 (or not, but instead directly) with receiving unit 110, control unit 120, database 125, and/or other components and/or elements via a communication path that includes a combination and/or one or more designated connections 160 and/or network 115.

In some embodiments network 115 may include cloud networks, local area networks (LAN), wide area networks (WAN), virtual private networks (VPN), wireless networks (using 802.11, for example), cellular networks (using 3G and/or LTE, for example), and/or other networks. In some embodiments the network 115 may include the internet.

In some embodiments sending unit 105 may include memory 135. In some embodiments memory 135 may include computer executable instructions that can be executed by one or more processors. These one or more processors may be present in an element of sending unit 105 (e.g., communication module and/or protected signal module 137) and/or one or more other components of system 100 (e.g., receiving unit 110 or control unit 120).

In some embodiments memory 135 may include computer executable instructions that may cause sending unit 105 to interact with one or more components of system 100, such as receiving unit 110. In some embodiments memory 135 may contain, among other code, the Basic Input-Output system (BIOS) which controls basic hardware operation such as the interaction with peripheral components or devices.

In some embodiments sending unit 105 may include protected signal module 137. In some embodiments protected signal module may include one or more processors to perform one or more functions. In some embodiments the protected signal module 137 may generate one or more signals. Or, the protected signal module 137 may transmit one or more signals originated from another sources—including but not limited to other components of system 100.

In some embodiments protected signal module 137 may be able to generate a signal having one or more characteristics. These characteristics may include creating one or more packets present in a signal. These one or more packets may include encryption information such as a key, authorization information such as a secret, and/or other information.

In some embodiments protected signal module 137 may be able to communicate with other components of system 100 directly, through communication module 133, by connection 160, and/or by other communication methods.

In some embodiments protected signal module 137 may transmit one or more packets of information that have been encrypted. In some embodiments communication module 133 may transmit one or more packets of information that have been encrypted by one or more modules of sending unit 105. These encrypted packets may have been encrypted by sending unit 105, receiving unit 110, and/or some other component—present in system 100 or not. In some embodiments these encrypted packets may include a status byte and/or one or more hash bytes. In some embodiments the one or more hash bytes may each include a 24 bit hash.

In some embodiments the one or more packets may include a counter, which may correspond to a number of events. The number of events may include the number of times one or more packets have been sent, the activation module 131 has been activated, and/or other events.

In some embodiments user feedback module may facilitate providing user feedback about one or more system 100 components. For example, user feedback module 139 may provide feedback related to sending unit 105, receiving unit 110, network 115, control unit 120, and/or database 125. In some embodiments user feedback module 139 may provide feedback related to connection 160. In some embodiments this feedback may include visual, audible, tactile, and/or other types of feedback, or some combination of two or more feedback types. In some embodiments this feedback may be related to one or more actuators (e.g., buttons) and/or light emitting diodes (LEDs).

In some embodiments the receiving unit 110 may forward a protected signal, that may include encrypted packets, to a control unit 120. In some embodiments control unit 120 may be a security system and/or home automation panel. In other embodiments receiving unit 110 may include, may be part of, or may be related to, a security system and/or home automation panel.

In some embodiments protected signal module 145 may transmit one or more packets of information that have been encrypted. In some embodiments communication module 141 may transmit one or more packets of information that have been encrypted by one or more modules of receiving unit 110. These encrypted packets may have been encrypted by one or more elements of sending unit 105, receiving unit 110, and/or some other component—present in system 100 or not. In some embodiments these encrypted packets may include status information (e.g., a status byte) and/or hash information (e.g., one or more hash bytes). In some embodiments the one or more hash bytes may each include a 24 bit hash.

In some embodiments control unit 120 may transmit one or more packets of information to receiving unit 110, sending unit 105, and/or other components of system 100. In some embodiments control unit 120 may transmit one or more packets of information, where at least some of the one or more packets of information include information previously transmitted to the control unit 120 from at least one of receiving unit 110, sending unit 105, and/or other components of system 100.

In some embodiments the sending unit 105 may include one or more information packets, where at least one of the one or more information packets may be encrypted and where at least one of the one or more information packets may include a hash.

In some embodiments the sending unit has an encryption algorithm designed to obscure data and/or a hash algorithm to require authentication of data. In some embodiments the encryption may include a rabbit encryption, symmetric cryptograph, asymmetric cryptography, and/or other type. In some embodiments the authentication hash is a 24 bit hash.

In some embodiments when activation module 131 is activated, (e.g., a button is pressed) data packets—encrypted and/or requiring authentication—are transmitted by the sending unit 105. In some embodiments the receiving unit 110 receives the data packets transmitted by the sending unit 105 and then decrypts the encrypted data in the data packets, if applicable. In some embodiments the encryption may include a key (e.g., a 128 bit key). In some embodiments processing module 147 may perform one or more operations disclosed with respect to the receiving unit 110. In some embodiments a protected signal comprises one or more data packets.

In some embodiments the key and/or the secret may be stored in the code section of sending unit 105, receiving unit 110, and/or others.

In some embodiments the receiving unit 110 receives the data packets transmitted by the sending unit 105 and then hashes/authenticates the data. In some embodiments the hash may include a secret (e.g., a 72 bit secret). Based at least in part on the hashing/authenticating of the data, the receiving unit 110 may transmit one or more data packets to control unit 120. Based at least in part on the hashing/authenticating of the data, the receiving unit 110 may transmit one or more data packets to a security and/or home automation system panel.

In some embodiments the sending unit 105 may generate a key used for encryption and/or a secret used for authentication. The key and/or the secret may be generated based on user input, based on system-detected parameters, based on system events, and/or automatically.

In some embodiments the key and/or the secret may be generated based on input received by the activation module 131. The input received by the activation module 131 may include a number of times a actuator (e.g., a button) is actuated. Or the input received by the activation module 131 may include whether a combination of one or more actuators are actuated. In some embodiments the input received by the activation module 131 may include whether one or more actuators are actuated for a time interval (e.g., 5, 10, 15, 20, or 30 seconds).

In some embodiments the input required to generate a key and/or a secret may be sufficient to prevent errant, meaningless generations. For example, the time interval required may be sufficiently long to avoid a user's errant input (e.g., 15 seconds or more). As another example, the input required may include one or more types of input—including but not limited to a input that a combination of one or more actuators are actuated over a certain time interval (e.g., buttons 1 and 3 are activated simultaneously for 15 seconds or more).

In some embodiments the key and/or the secret may each be random, pseudo-random, non-random, non-pseudo random, and/or some combination. In some embodiments the key is generated using a very low oscillator (vlo) and a random jump number that may be incremented by a predetermined value at a specified event (e.g., activating activation module 131). In some embodiments the secret is generated using a very low oscillator (vlo) and a random jump number that may be incremented by a predetermined value at a specified event (e.g., activating activation module 131).

In some embodiments the sending unit 105 may transmit a key and/or a secret. In some embodiments transmitting a key and/or a secret from the sending unit 105 to another component of system 100 may occur after a certain time interval. For example, sending unit 105 may generate a key and/or a secret during a 15 second interval and then sending unit 105 may transmit the key and/or the secret after the 15 completion of the 15 second interval.

In some embodiments the sending unit may transmit the key and/or the secret during the same time interval when each is generated. For example, sending unit 105 may generate a key and/or a secret during a 15 second interval and transmit the key and/or the secret during the same 15 second interval.

In some embodiments the receiving unit 110 may receive the key and/or the secret. Based at least in part on receiving the key and/or the secret, the receiving unit 110 may store, transmit, map, and/or capture, identifying information related to the sending unit 105 that transmitted the key and/or the secret. In some embodiments this identifying information may include the key serial number of the sending unit.

In some embodiments the receiving unit 110 may transmit the key and/or the secret to the control unit 120. In other embodiments the receiving unit 110, based at least in part on receiving the key and/or the secret, may store, transmit, map, and/or capture, identifying information to the control unit 120, where the information may be related to the sending unit 105 that transmitted the key and/or the secret. In other embodiments the receiving unit 110, based at least in part on receiving the key and/or the secret, may store, transmit, map, and/or capture, identifying information to the control unit 120, where the information may be related to the key and/or the secret.

In some embodiments the sending unit 105 may communicate and/or be compatible with control unit 120 that may include a panel. In some embodiments the sending unit 105 may be backwards compatible with control unit 120 that may include a panel. In some embodiments the one or more data packets requiring decryption and hashing are transmitted by sending unit 105 to receiving unit 110 that may perform the decryption and/or the hashing; then at least some of the now-decrypted and/or the now-authenticated data packets may be transmitted to the control unit 120.

In some embodiments the communication of information, including one or more data packets between the receiving unit 110 and control unit 120 may also include certain protections. In some embodiments this communication protection may include encryption having a key and/or authentication having a secret.

In some embodiments the receiving unit 110 may perform certain actions related to data packets, including but not limited to those data packets transmitted by the sending unit 105. In some embodiments performing certain actions may be based at least in part on whether: the key and/or the secret have been transmitted to the receiving unit 110; the identifying information has been transmitted or received by the sending unit 105, receiving unit 110, and/or control unit 120; and/or other related parameters. In some embodiments these certain actions may include decrypting one or more encrypted data packets, authenticating one or more data packets requiring authentication, and/or other related actions.

In some embodiments the key and the secret may be transmitted by and/or to one or more devices. In some embodiments the key and the secret may be transmitted simultaneously, in parallel, in series, and/or otherwise. For example, sending unit 105 may transmit the secret to the receiving unit 110 and then transmit the key to the receiving unit 110. In other embodiments sending unit 105 may transmit the key to the receiving unit 110 and then transmit the secret to the receiving unit 110 and/or the control unit 120.

In some embodiments any transmitting and/or communication may be performed via network 115. In some embodiments network 115 may include a wired network, while in other embodiments network 115 may include a wireless network. In some embodiments of system 100 (and others) network 115 may include wired/and or wireless connections. In some embodiments components such as receiving unit 110 and control unit 120 may be connected in multiple ways, including having one or more wired and/or one or more wireless connections.

In some embodiments sending unit 105 may have one or more pieces of identifying information associated with it. This identifying information may include but is not limited to a key serial number, a unit number, a model name, a model number, a software or a hardware version, and/or other related information.

In some embodiments activating activation module 131 change, modify, advance, and/or one or more of the identifying information. For example, in some embodiments when a user activates one or more buttons a key serial number associated with the sending unit will advance in the sending unit 105 to a second key serial number. This second key serial number associated with the sending unit may be transmitted to the receiving unit 110 based on a distance 163 and may be stored in memory 143, database 125, and/or other locations. If the sending unit 105 is within a certain distance 163 of receiving unit 110, then the second key serial number may be transmitted to the receiving unit. In some embodiments activating activation module 131 change, modify, and/or advance one or more of the key and the secret.

In some embodiments at least one of the sending unit 105 and the receiving unit 110 may iterate one or more pieces of information, including but not limited to the key serial number, the key, the secret, and/or other information. For example, sending unit 105 may receive an input (e.g., activating activation module 131 such as a user pushing a button on sending unit 105). Based at least in part on this input, the information—such as the key serial number—may be incremented. In some embodiments the key serial number (and/or other information such as the key) may be incremented based on every input iteration. For example, for every input received a "Rabbit" (e.g., a cipher) may be generated, one or more counters may be advanced, and/or the key serial number may be modified, changed, and/or advanced.

In some embodiments after a predetermined number of iterations different operations may be performed. For example after four iterations a rabbit may be iterated and one or more counters may be advanced and/or after twelve iterations the key serial number may be modified, changed, and/or advanced and/or a new key (associated with encryption) may be generated and inserted to at least one of the sending unit 105, receiving unit 110, and/or control unit 120. In some embodiments four iterations may be advantageous based on using a 128 bit key, where for the four events use a sufficient number of bits to be secure but only uses one-fourth of a 128 bit key. In some embodiments twelve iterations may be advantageous based on using a 128 bit key, where the twelve iterations use a sufficient number of bits to be secure but only uses in effect three full "events" of related to the 128 bit key where each group of four iterations only requires one full 128 bit key.

In some embodiments the encryption may include a key insertion, iteration, and/or generation. In some embodiments the key insertion is executed after a predetermined number of inputs (e.g., activating activation module 131) such as X events. In some embodiments the iteration is executed after a predetermined number of inputs, which may be more, less, or related by a specific relationship to X (e.g., X/3). In some embodiments sending unit 105 and receiving unit 110 begin with the same base key.

After X events a new key may be inserted to at least one signal of sending unit 105 an/or receiving unit 110. The new key may be derived based at least in part on the base key and/or the key serial number, where the key serial number may include a counter. In some embodiments the key serial number may be set at an initial value. Based on one or more inputs, the key serial number may be changed, decreased, incremented, and/or advanced. For example, when activation module 131 is activated the key serial number may advance by increments of 1, 2, 3, etc. In some embodiments the key serial number may be used by the receiving unit 110 to determine if it is synced with the sending unit 105. In some embodiments based at least in part on this determining at least one component of system 100 (e.g., receiving unit 110) may advance its encryption to correspond to the key serial number of the sending unit 105 (e.g., a portable transmitter).

In some embodiments, however, if distance 163 is more than a predetermined value then the key serial number will advance in the sending unit (e.g., from a first key serial number to a second key serial number) but not in the receiving unit 110. This distance may be calculated using GPS, one or more proximity sensors in sending unit 105 and/or receiving unit 110, one or more other sensors in communication with at least one component of system 100, based on learned user behavior, and/or by other methods.

In some embodiments whether the identifying information is transmitted and/or received by one or more devices may be based at least in part on distance and/or signal strength. For example, whether the sending unit 105 transmits the key and/or the secret to receiving unit 110 may be based at least in part on a threshold signal strength level, including but not limited to a received signal strength indication (RSSI), a received channel power indicator (RCPI), and/or another signal strength measure.

In some embodiments when the signal strength level, such as an RSSI level, falls below a predetermined threshold then sending unit 105 will not transmit the data packets, the key, the secret, and/or other information. In some embodiments when the signal strength level, such as an RSSI level, falls below a predetermined threshold then receiving unit 110 will not transmit and/or receive the data packets, the key, the secret, and/or other information. In some embodiments this predetermined level may be based at least in part on a numerical value (e.g., 10%, 30%, 50%, 70%, etc.) and/or may be based at least in part on set level (e.g., 0×10, 0×30, 0×50, 0×70, 0×90). For example, in some embodiments if the RSSI level associated with the sending unit 105 falls below a threshold level—such as 0×30—the one or more packets are discarded by the receiving unit 110.

In some embodiments if the key serial number associated with the sending unit 105 advances at the sending unit 105 but not the receiving unit 110, then the sending unit 105 may continue to advance the key serial number and/or continue to transmit the now-advanced key serial number. In some embodiments after the sending unit 105 has advanced the key serial number, the sending unit 105 will transmit an updated key serial number to the receiving unit 110 when the two are within a distance 163. In some embodiments, this distance 163 may be a predetermined value, including but not limited to a system limitation, a programmed designated value, and/or other factors.

In some embodiments comparison module 149 may compare one or more pieces of information, including but not limited to information transmitted from the sending unit 105. In some embodiments comparison module 149 may compare one or more portions of a key serial number, a key, a secret, an encrypted data packet, a counter, a distance, an iteration value, and/or any other information. In some embodiments comparison module 149 may compare information related to or stored in receiving unit 110 with information related to or stored in sending unit 105. In some embodiments comparison module 149 may compare information related to or stored in receiving unit 110 with information related to or stored in control unit 120. In some embodiments comparison module 149 may compare information related to or stored in receiving unit 110 with information related to or stored in database 125.

Alternatively in some embodiments if the key serial number has been advanced a certain number of N times, then the sending unit 105 and the receiving unit 110 may require additional information and/or steps in order to communicate with each other. In some embodiments N may be approximately 10, 20, 50, 75, 100, 200, 500, 1000, etc. In some embodiments then the sending unit 105 and the receiving unit 110 may require resetting the key and/or the secret based on one or more parameters. In some embodiments then the sending unit 105 and the receiving unit 110 may require resetting a random key and/or a random secret based on one or more parameters.

In some embodiments the key serial number that may be associated with one or more sending units 105 may influence the encryption key used. In some embodiments the key may include at least part of the key serial number, which may be used by the sending unit 105, the receiving unit 110, and/or other components. In some embodiments the key may include at least part of the key serial number and the receiving unit 110 may use at least part of the key serial number to identify and/or associate the key as transmitted by or related to one or more sending units 105.

In some embodiments control unit 120 may include a user interface 151, application 153, communication module 155, and/or processing module 157. At least some of these elements may exhibit similar and/or different characteristics to other elements disclosed with respect to other component (i.e., communication module 155 may be similar and/or different to communication modules 133 and/or 141).

In some embodiments control unit 120 may display a notification on a display, which may include user interface 151. This notification may relate at least in part to the protected signal module 137 related information, including but not limited to the protected signal including one or more data packets, the key, the secret, and/or the key serial number, among other things. movement detection data and/or other information related to elements of the movement detection module including, but not limited to, activation module 131, communication module 133, memory 135, protected signal module 137, and/or user feedback module 139.

In some embodiments application 153 may be installed on control unit 120 in order to allow a user to interface with one or more functions of sending unit 105 and/or receiving unit 110, network 115, control unit 120, and/or database 125.

In some embodiments one or more devices illustrated in system 100 may communicate and/or link to database 125. Database 125 may include stored content 159 and/or user related content 161. In some embodiments stored content 159 may include data generated, transmitted, or compared by at least one of sending unit 105, receiving unit 110, control unit 120, and/or network 115. In some embodiments information related to data packets, that may be encrypted and/or require authentication, may be included as stored content 159. In some embodiments receiving unit 110 and/or control unit 120 may access stored content 159 in database 125 over network 115. In some embodiments database 125 may be internal or external to one or more components of system 100 (i.e., connected to a device through network 115 and/or connected directly to one or more devices of system 100). For example, at least a portion of database 125 may be internal and/or external to sending unit 105, receiving unit 110, and/or control unit 120. In some embodiments user related content 161 may include, but is not limited to, user preferences, passwords, personal information, system information (e.g., model numbers, installation dates, etc.), content specification other components of system 100 including sending unit 105, receiving unit 110, control unit 120, and/or network 115, and/or information designated by the user and/or an administrator as related to the system.

Figure 2:
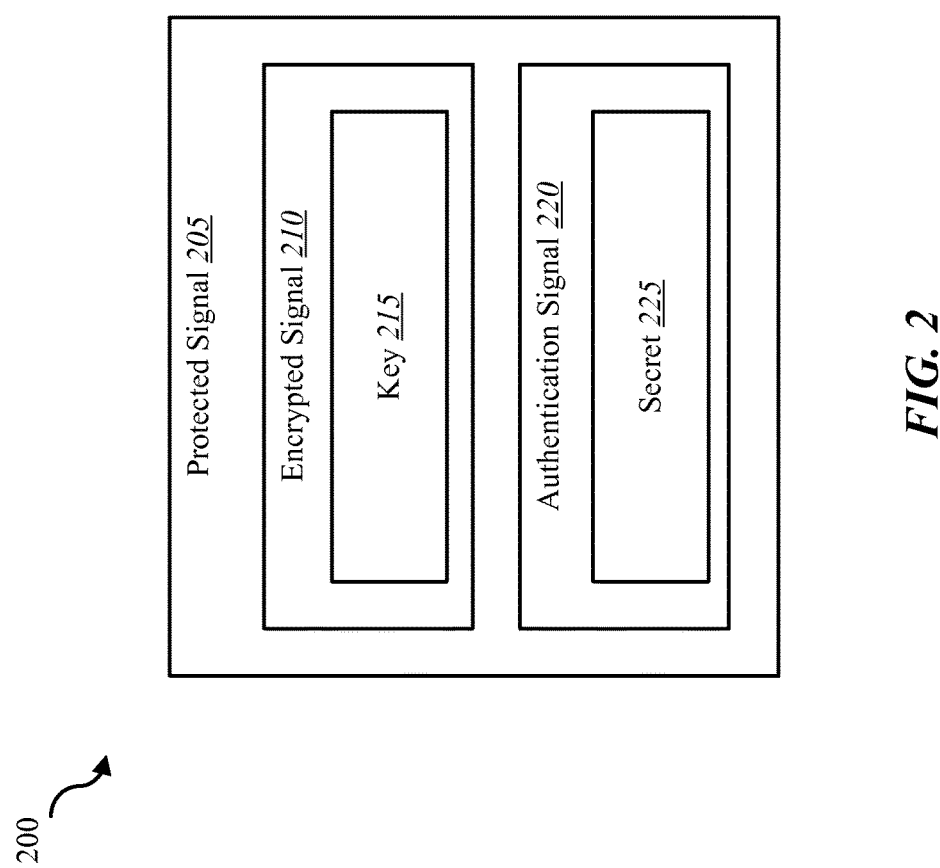
FIG. 2 depicts a block diagram of exemplary systems and methods suitable for implementing the present systems and methods.

In some embodiments a protected signal including one or more data packets may be transmitted, analyzed, and/or have one or more actions performed on the protected signal. FIG. 2 is a block diagram illustrating one example of system 200, which may or may not include every part shown. As discussed in this disclosure, protected signal 205 may include an encrypted signal 210 which may include a key 215 and/or an authentication signal 220 and a secret 225. In some embodiments protected signal 205 may include one or more data packets. Each of these one or more data packets—in whole or in part—may be encrypted creating encrypted signal 210. The one or more data packets may be encrypted using one or more keys 215. In some embodiments protected signal 205 may include one or more data packets. Each of these one or more data packets in authentication signal 220—in whole or in part—may require authentication (i.e., may be hashed). The one or more data packets may include using one or more secrets 225.

Figure 3:
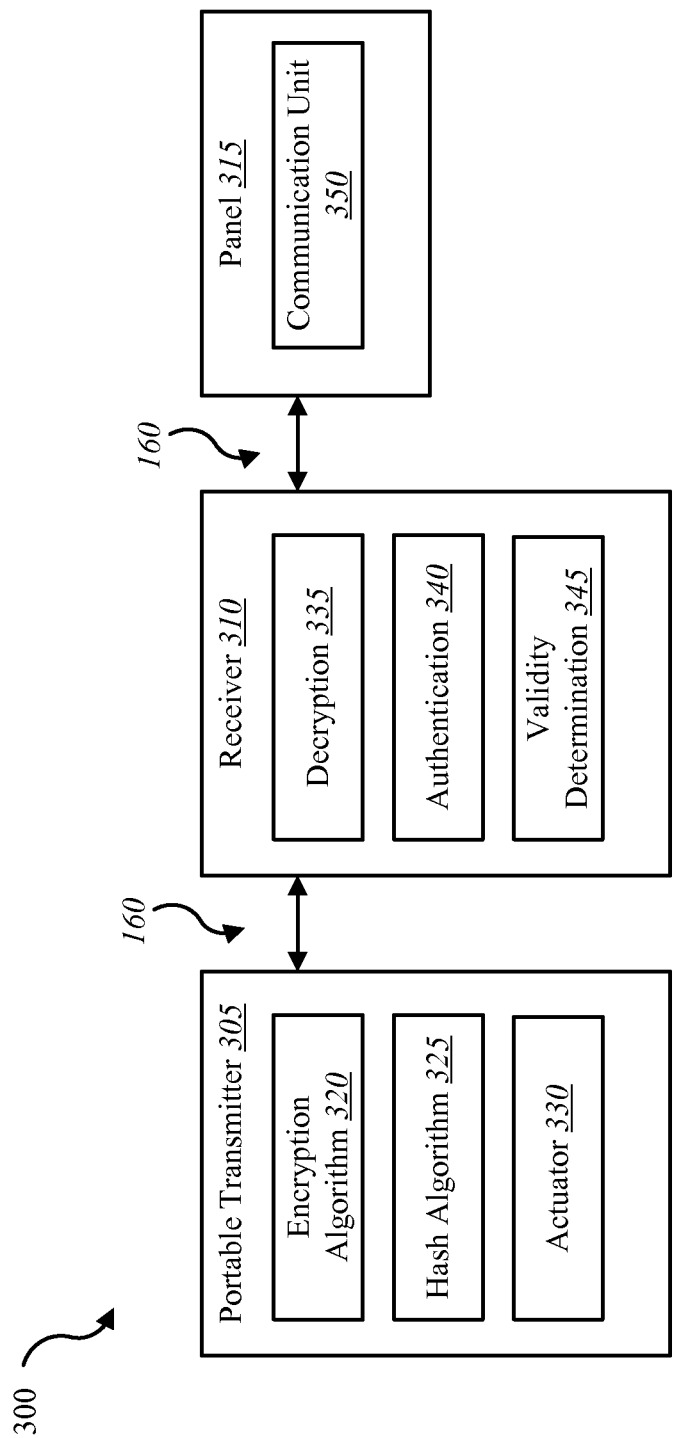
FIG. 3 depicts a block diagram of exemplary systems and methods suitable for implementing the present systems and methods.

FIG. 3 is a block diagram illustrating one example of system 300, which may include portable transmitter 305, receiver 310, and/or panel 315. In some embodiments portable transmitter 305 may include a key fob. In some embodiments portable transmitter 305 may encrypt one or more data packets using encryption algorithm 320 and/or require authentication using hash algorithm 325. In some embodiments portable transmitter 305 may employ at least on of encryption algorithm 320 and hash algorithm 325 based at least in part on input received related to actuator 330 (e.g., a button).

In some embodiments receiver 310 may perform decryption 335 of a protected signal based at least in part on receiving information from and/or related to portable transmitter 305. In some embodiments receiver 310 may perform authentication 340 of a protected signal based at least in part on receiving information from and/or related to portable transmitter 305. In some embodiments after performing at least one of decryption 335 and authentication 340, receiver 310 may be able to make one or more validity determinations 345. In some embodiments these validity determinations may include verifying one or more pieces of information related to the encryption algorithm 320, hash algorithm 325, actuator 330, decryption 335, authentication 340, and/or other operations discussed with respect to systems 100, 200, 300, and/or others.

In some embodiments panel 315 may connect to receiver 310 and/or portable transmitter 305 via one or more connections 160. In some embodiments panel 315 may include a security system and/or home automation system panel. In some embodiments this panel 315 may have been installed and setup prior to using portable transmitter 305 and/or receiver 310. In some embodiments communication unit 350 may receive a protected signal transmitted by at least one of portable transmitter 305 and receiver 310. In some embodiments communication unit 350 may receive a decrypted signal (decrypted using decryption 335) and/or an authenticated signal (authenticated using authentication 340) transmitted by at least one of portable transmitter 305 and/or receiver 310.

It should be noted that only some variations of the exemplary systems, such as systems 100 and 300, are shown and/or described and that a person of ordinary skill in the art having a basic understanding of certain concepts will be able to implement the ideas disclosed here to perform one or more movement detections based on movement detection data and other functions disclosed. In some embodiments some, most, all, and/or any other combination of the elements shown in FIGS. 1-3 may be related, connected, and/or in communication with each other.

Figure 4:
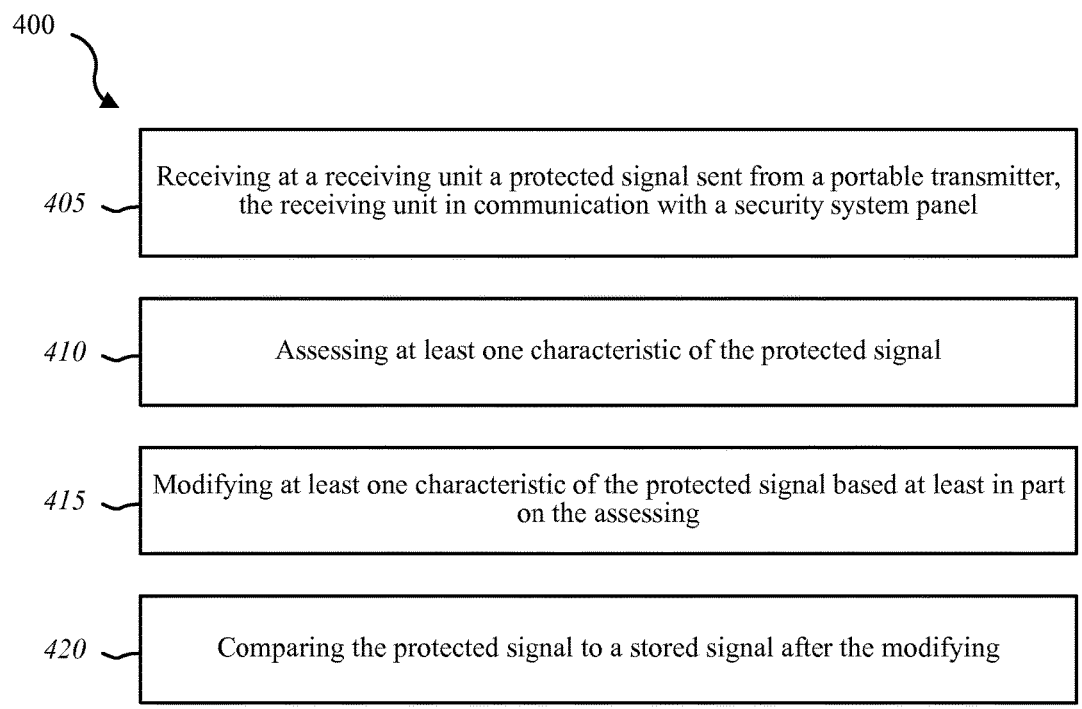
FIGS. 4-9 depict block diagrams of exemplary methods and systems suitable for implementing the present systems and methods.

FIG. 4 shows exemplary methods 400 and systems in accordance with some embodiments. In some embodiments a method incorporating the present systems and methods may include receiving at a receiving unit a protected signal sent from a portable transmitter, the receiving unit in communication with a security system panel, assessing at least one characteristic of the protected signal, modifying at least one characteristic of the protected signal based at least in part on the assessing, and/or comparing the protected signal to a stored signal after the modifying—as shown in blocks 405, 410, 415, and 420. In some embodiments any and/or all of these operations may be performed by or at the sending unit, the receiving unit, the control unit, the network, the database, the panel, and/or other components.

In some embodiments a protected signal may include an encrypted and/or hashed (requiring authentication) signal. As shown in FIG. 4, when a protected signal is received by a receiving unit (or another component of the system), the receiving unit (or other component of the system) may assess the protected signal. In some embodiments this assessment may include determining whether the protected signal includes an encryption, a hash, a key, a secret, and/or other information. In some embodiments the protected signal may only include one or more encrypted portions or one or more hashed portions—not both.

In some embodiments modifying at least one characteristic of the protected signal based at least in part on the assessing may include decrypting at least a portion of the protected signal. In some embodiments modifying at least one characteristic of the protected signal based at least in part on the assessing may include authenticating at least a portion of the protected signal. In some embodiments modifying at least one characteristic of the protected signal based at least in part on the assessing may include changing, advancing, resetting, and/or reordering one or more protected signal parts such as an encrypted portion, a non-encrypted portion, a hashed portion, a non-hashed portion, a key serial number portion, a non-key serial number portion, and/or other protected signal parts.

In some embodiments comparing the protected signal to a stored signal after the modifying may include comparing a protected signal received at a receiving unit with a signal stored by one or more components, including but not limited to the receiving unit. In some embodiments comparing the protected signal to a stored signal after the modifying may include validating at least a portion of the protected signal based on one or more parameters. These one or more parameters may, in some embodiments, relate to an encrypted portion and/or a hashed portion of the protected signal. In some embodiments comparing may include comparing one or more specific sections (e.g., bytes and/or bits) of a protected signal with other information—stored and/or related to one or more components, such as receiving unit. In some embodiments comparing may include correlating at least a portion of the protected signal with another signal. In some embodiments comparing may include correlating at least a portion of the protected signal with another protected signal or the same protected signal but referenced from a different time period.

Figure 5:
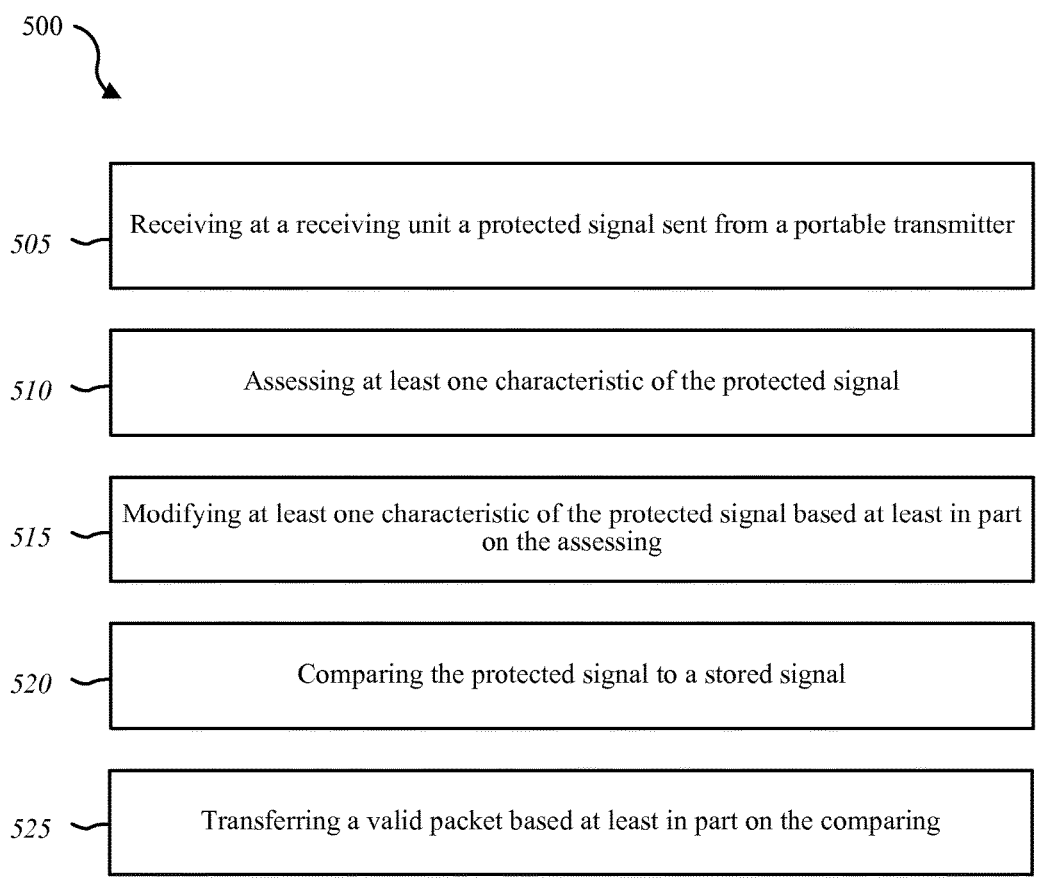

FIG. 5 shows exemplary methods 500 and systems in accordance with some embodiments. In some embodiments a method incorporating the present systems and methods may include receiving at a receiving unit a protected signal sent from a portable transmitter, assessing at least one characteristic of the protected signal, modifying at least one characteristic of the protected signal based at least in part on the assessing, comparing the protected signal to a stored signal, and/or transferring a valid packet based at least in part on the comparing—as shown in blocks 505, 510, 515, 520, and 525. In some embodiments any and/or all of these operations may be performed by or at the sending unit, the receiving unit, the control unit, the network, the database, the panel, and/or other components.

In some embodiments the receiving unit may be in communication—directly or indirectly—with a security system panel. In some embodiments comparing the protected signal to a stored signal may occur before, during, and/or after other method steps. For example, comparing the protected signal to a stored signal may occur after assessing at least one characteristic of the protected signal but before modifying at least one characteristic of the protected signal based at least in part on the assessing.

In some embodiments transferring a valid packet may include transferring the valid packet from the receiving unit to the panel. In some embodiments transferring a valid packet may include transferring the valid packet from the receiving unit to any component associated with a system (e.g., system 100), including a control device.

In some embodiments if comparing the protected signal to a stored signal shows the protected signal (in whole or in part) is invalid, then the system may perform one or more other steps. In some embodiments the invalid packet may be transmitted back to the component that it was received from. In some embodiments the invalid packet may be transmitted back to a different component than component that it was received from. In some embodiments determining that a packet is invalid or has one or more different characteristics from the stored signal may trigger one or more system components to act in a different state, such as an alarm mode. In some embodiments determining that a packet is invalid or has one or more different characteristics from the stored signal may trigger one or more system components to send a notification and/or an alert to one or more system components.

Figure 6:
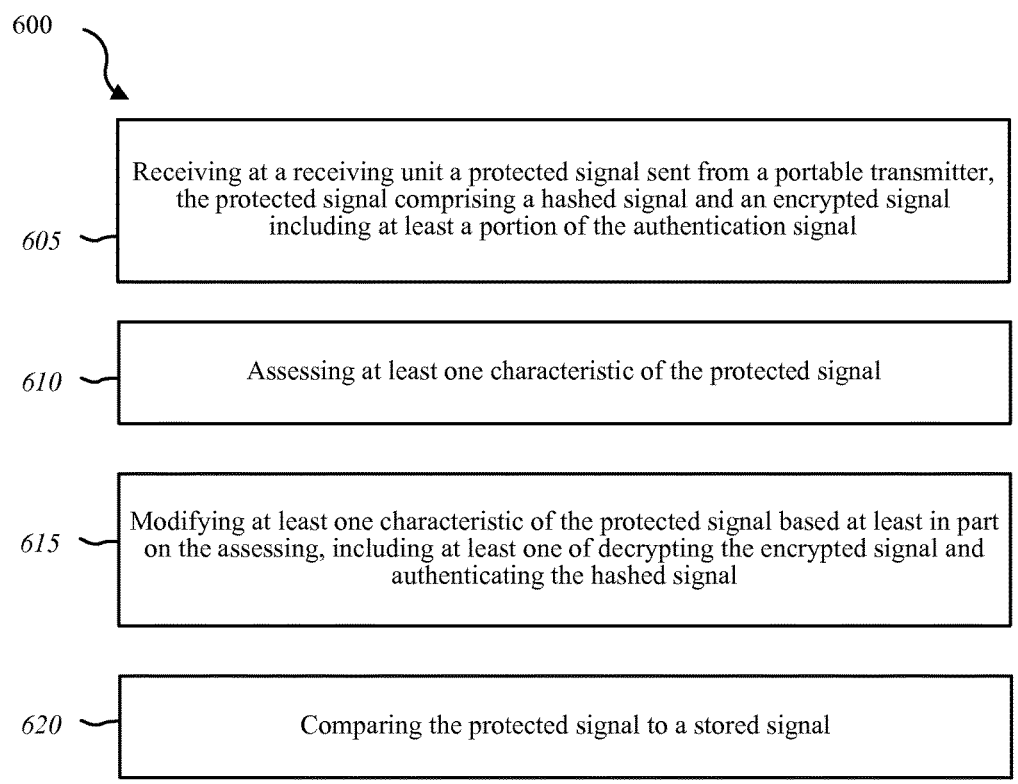

FIG. 6 shows exemplary methods 600 and systems in accordance with some embodiments. In some embodiments a method incorporating the present systems and methods may include receiving at a receiving unit a protected signal sent from a portable transmitter, the protected signal comprising a hashed signal and an encrypted signal including at least a portion of the authentication signal, assessing at least one characteristic of the protected signal, modifying at least one characteristic of the protected signal based at least in part on the assessing, including at least one of decrypting the encrypted signal and authenticating the hashed signal, and/or comparing the protected signal to a stored signal—as shown in blocks 605, 610, 615, and 620. In some embodiments any and/or all of these operations may be performed by or at the sending unit, the receiving unit, the control unit, the network, the database, the panel, and/or other components.

As disclosed in FIG. 2, in some embodiments the protected signal may include an encrypted signal and/or a hashed signal requiring authentication—each comprising a portion of the protected signal. In some embodiments the protected signal may include an encrypted signal and a hashed signal requiring authentication, where at least a portion of the encrypted signal and the hashed signal overlap and/or are included together. For example, at least some of the same bytes of the protected signal may be encrypted (e.g., bytes 1-4) and also may require authentication (e.g., bytes 2-4).

Figure 7:
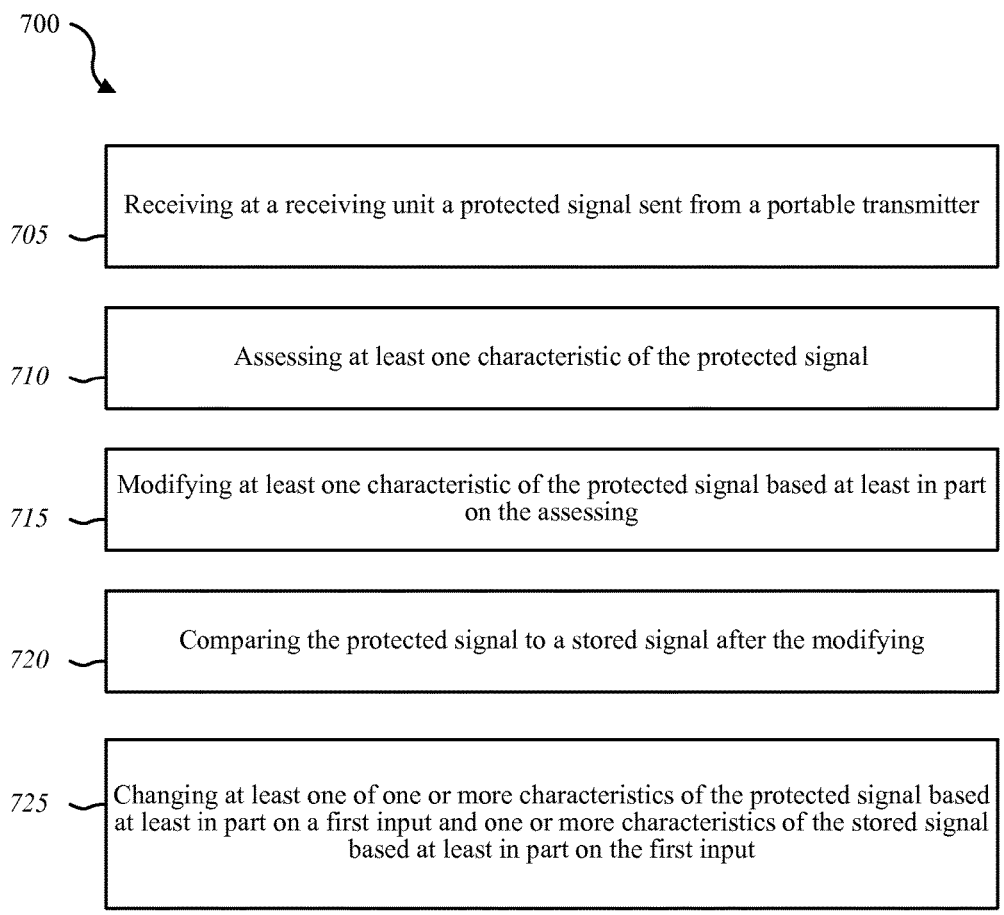

FIG. 7 shows exemplary methods 700 and systems in accordance with some embodiments. In some embodiments a method incorporating the present systems and methods may include receiving at a receiving unit a protected signal sent from a portable transmitter, assessing at least one characteristic of the protected signal, modifying at least one characteristic of the protected signal based at least in part on the assessing, comparing the protected signal to a stored signal after the modifying, and/or changing at least one of one or more characteristics of the protected signal based at least in part on a first input and/or one or more characteristics of the stored signal based at least in part on the first input—as shown in blocks 705, 710, 715, 720, and 725. In some embodiments any and/or all of these operations may be performed by or at the sending unit, the receiving unit, the control unit, the network, the database, the panel, and/or other components.

In some embodiments changing at least one of one or more characteristics of the protected signal based at least in part on a first input, as discussed throughout this disclosure. For example, this input may include a user input, which may include but is not limited to a user activating one or more activation modules (i.e., actuating one or more buttons). In some embodiments this input may also or alternatively include any input transmitted and/or received by one or more of a sending unit, a receiving unit, a control unit, a database, a portable transmitter, a panel, and/or other system components and/or elements.

In some embodiments the sending unit can change one or more characteristics of the protected signal based at least in part on a first input and/or a second input. In some embodiments the receiving unit can change one or more characteristics of the stored signal based at least in part on the first input and/or the second input. In some embodiments a method may include changing at least one of the protected signal and the stored signal based at least in part on one of the first input and/or the second input.

In some embodiments the one or more characteristics may include a key, a secret, a key serial number, information related to encryption, information related to authentication, information related to a protected signal, one or more components of a system (e.g., a sending unit, a receiving unit, a control unit, a database, a portable transmitter, a panel), and/or other related characteristics. In some embodiments, based at least in part on the first input, at least one of one or more characteristics of the protected signal may be changed. In some embodiments, based at least in part on the first input, at least one of one or more characteristics of the stored signal may be changed.

Figure 8:
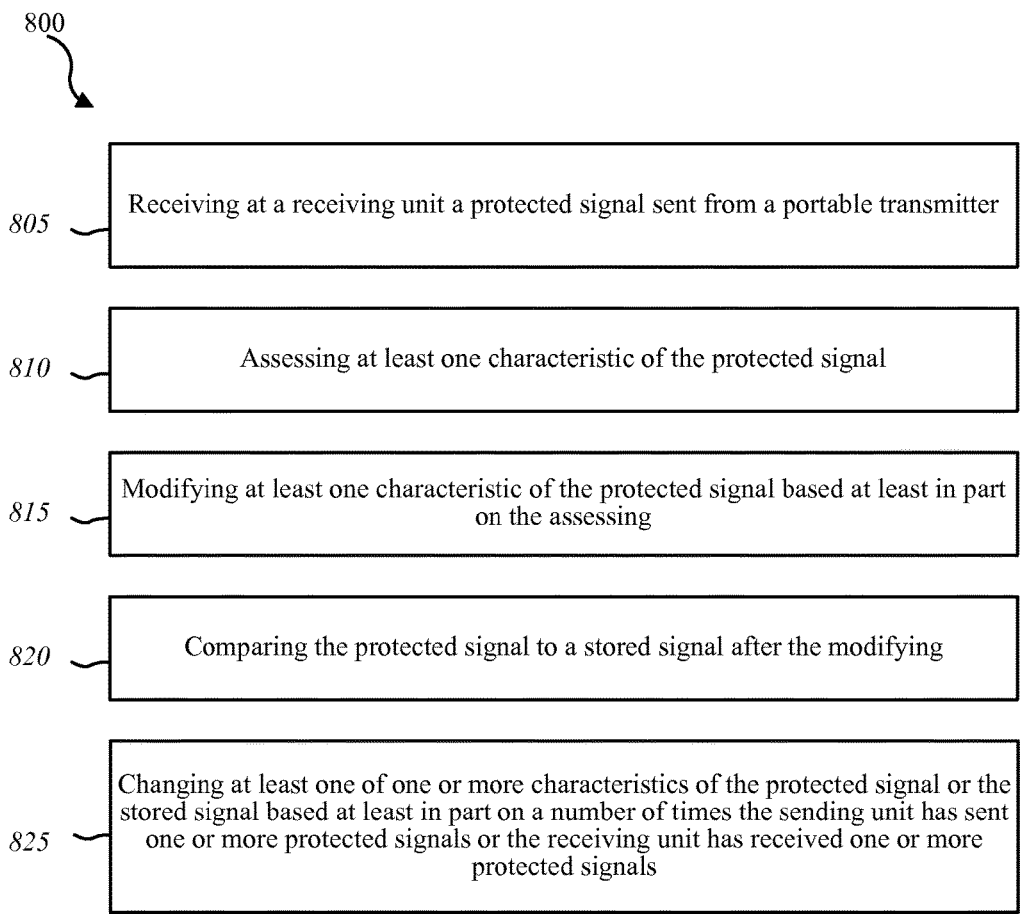

FIG. 8 shows exemplary methods 800 and systems in accordance with some embodiments. In some embodiments a method incorporating the present systems and methods may include receiving at a receiving unit a protected signal sent from a portable transmitter, assessing at least one characteristic of the protected signal, modifying at least one characteristic of the protected signal based at least in part on the assessing, comparing the protected signal to a stored signal after the modifying, and/or changing at least one of one or more characteristics of the protected signal or the stored signal based at least in part on a number of times the sending unit has sent one or more protected signals or the receiving unit has received one or more protected signals—as shown in blocks 805, 810, 815, 820, and 825. In some embodiments any and/or all of these operations may be performed by or at the sending unit, the receiving unit, the control unit, the network, the database, the panel, and/or other components.

In some embodiments the system may be able to provide a protected signal having an encryption, a hash requiring authentication, and changing at least one of one or more characteristics of the protected signal based at least in part on a first input, which may or may not include a number of times the sending unit has sent one or more protected signals or the receiving unit has received one or more protected signals.

Figure 9:
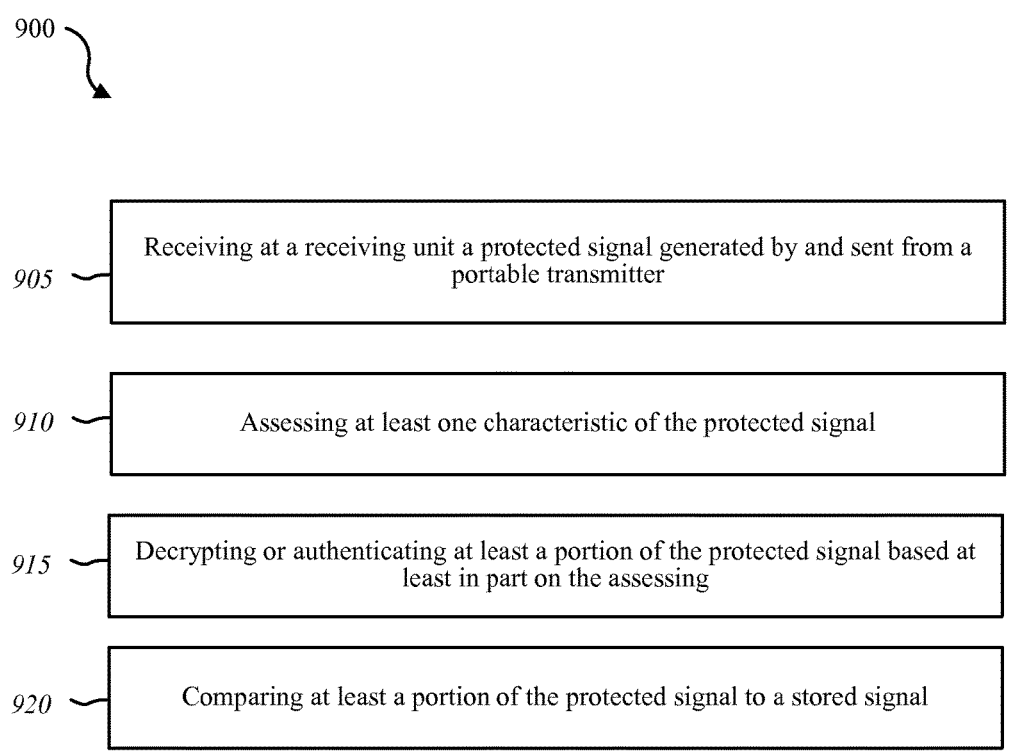

FIG. 9 shows exemplary methods 900 and systems in accordance with some embodiments. In some embodiments a method incorporating the present systems and methods may include receiving at a receiving unit a protected signal generated by and sent from a portable transmitter, assessing at least one characteristic of the protected signal, decrypting or authenticating at least a portion of the protected signal based at least in part on the assessing, and/or comparing the protected signal to a stored signal—as shown in blocks 905, 910, 915, and 920. In some embodiments any and/or all of these operations may be performed by or at the sending unit, the receiving unit, the control unit, the network, the database, the panel, and/or other components.

In some embodiments the portable transmitter may generate a protected signal, while in other embodiments the protected signal may be generated by a different system component and/or element (e.g., a receiving unit and/or a control device). In some embodiments the receiving unit decrypt and/or authenticate at least a portion of the protected signal based at least in part on an assessment (performed by the receiving unit and/or another system component and/or element), while in other embodiments the protected signal may be decrypted and/or authenticated by a different system component and/or element (e.g., a sending unit and/or a control device). In some embodiments a sending unit may include a portable transmitter, such as a key fob.

In some embodiments system and/or methods may include functions related to user devices. In some embodiments a user may access one or more functions of at least one of a sending unit, a receiving unit, a control unit, a database, a network, and/or any other device related to a system from a computing device. For example, in some embodiments the computing device may include a mobile application that interfaces with one or more functions of a sending unit, a receiving unit, a control unit, a database, a network, and/or any other device related to a system.

Figure 10:
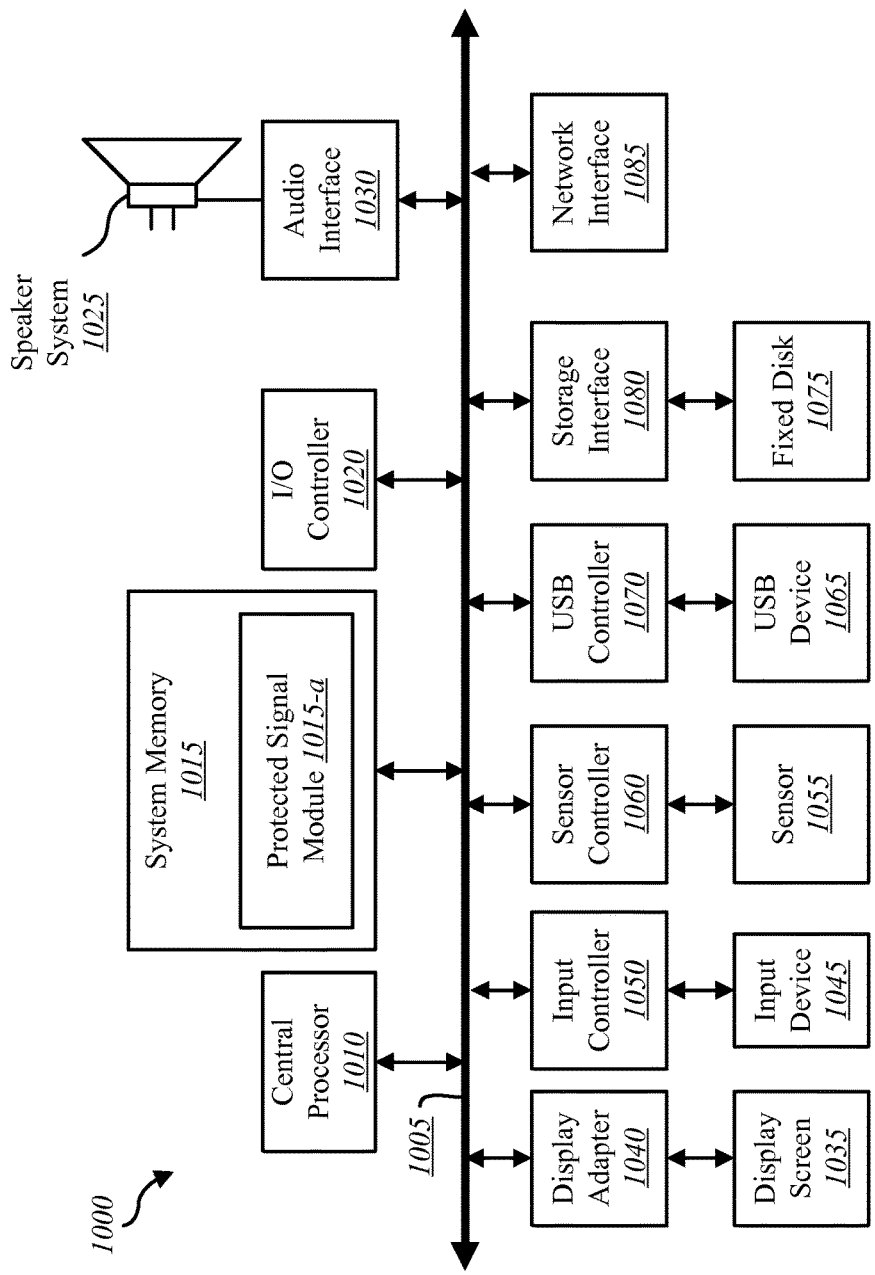
FIG. 10 depicts a block diagram of exemplary systems and methods suitable for implementing the present systems and methods.

FIG. 10 depicts a block diagram of a controller 1000 suitable for implementing the present systems and methods. In some embodiments controller 1000 includes a bus 1005 which interconnects major subsystems of controller 1000, such as a central processor 1010, a system memory 1015 (typically RAM, but which may also include ROM, flash RAM, and/or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the protected signal module 1015-a to implement the present systems and methods may be stored within the system memory 1015. Applications resident with controller 1000 are generally stored on and accessed via a non-transitory computer readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments one or more sensors (e.g., motion sensor, smoke sensor, glass break sensor, door sensor, window sensor, carbon monoxide sensor, and the like) connect to controller 1000 wirelessly via network interface 1085 and/or using wired connections.

Many other devices or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 may be readily known in the art and are not discussed in detail in this application. Code to implement the present disclosure can be stored in a non-transitory computer-readable medium such as one or more of system memory 1015 or fixed disk drive 1075. The operating system provided on controller 1000 may be iOS®, ANDROID®, MS-dOS®, MS-WINDOWS®, OS/2®, UNIX®, LINUX®, or another known operating system.

In some embodiments one or more systems and/or system components may serve as or include one or more transmitters and/or receivers—such as an antenna—to receive one or more signals. The signals received may include wireless communication signals such as radio frequency, electromagnetics, local area network (LAN), wide area network (WAN), virtual private network (VPN), wireless network (using 802.11, for example), cellular network (using 3G and/or LTE, for example), or other signals. These antennas may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna may receive signals or information specific to itself. In other embodiments each antenna may receive signals or information not exclusive to itself.

In some embodiments this disclosure may specifically apply to security system applications. In some embodiments this disclosure may specifically apply to home or business automation system applications, including a portable transmitter transmitting a protected signal that may require decryption and/or authentication to a receiving unit which may perform the decryption and/or authentication. Distinct advantages of such a system for these specific applications are apparent from this disclosure.

While this disclosure discusses various embodiments using specific block diagrams, flowcharts, and examples, each block diagram component, flowchart action, operation, and/or component described and/or illustrated may be implemented, individually and/or collectively, using a wide range of hardware, software, and/or firmware (or any combination thereof) configurations. In addition, any disclosure of components contained within other components or separate from other components should be considered exemplary because multiple other architectures may potentially be implemented to achieve the same functionality, including incorporating all, most, and/or some elements as part of a unitary structure or separate structures.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least in part on."

What is claimed is:

1. A computer-implemented method for operating a security system, comprising:
   receiving at a receiving unit a protected signal sent from a portable transmitter, the receiving unit in communication with a security system panel, wherein the protected signal comprises an authentication signal having a secret;
   assessing at least one characteristic of the protected signal;
   modifying at least one characteristic of the protected signal based at least in part on the assessing, wherein modifying the protected signal comprises authenticating the authentication signal, and wherein the authentication signal comprises a hash;
   comparing, at the receiving unit, the protected signal to a stored signal after the modifying, wherein comparing the protected signal to the stored signal comprises determining whether at least one packet of the protected signal is valid; and
   transmitting, to the portable transmitter, an indication of whether the protected signal is valid based at least in part on comparing the protected signal to the stored signal, wherein the indication comprises a signal to enter a security mode based at least in part on determining that the at least one packet of the protected signal is invalid.

2. The method of claim 1, wherein the protected signal comprises an encrypted signal having a key.

3. The method of claim 2, wherein modifying the protected signal comprises decrypting the encrypted signal.

4. A computer-implemented method for operating a security system, comprising:
   receiving at a receiving unit a protected signal sent from a portable transmitter, the receiving unit in communication with a security system panel, wherein the protected signal comprises an authentication signal having a secret, wherein the protected signal further comprises an encrypted signal, and wherein the encrypted signal comprises at least a portion of the authentication signal;
   assessing at least one characteristic of the protected signal;

modifying at least one characteristic of the protected signal based at least in part on the assessing;

comparing, at the receiving unit, the protected signal to a stored signal after the modifying, wherein comparing the protected signal to the stored signal comprises determining whether at least one packet of the protected signal is valid; and transmitting, to the portable transmitter, an indication of whether the protected signal is valid based at least in part on comparing the protected signal to the stored signal, wherein the indication comprises a signal to enter a security mode based at least in part on determining that the at least one packet of the protected signal is invalid.

5. The method of claim 4, wherein modifying the protected signal further comprises:

decrypting the encrypted signal received at the receiving unit; and authenticating the authentication signal received at the receiving unit.

6. The method of claim 1, wherein the portable transmitter comprises a key fob.

7. The method of claim 1, further comprising:

changing one or more characteristics of the protected signal based at least in part on a first input; and changing one or more characteristics of the stored signal based at least in part on the first input.

8. The method of claim 7, wherein the first input comprises a user input.

9. The method of claim 8, wherein the first input comprises a number of times the user input has been received.

10. The method of claim 7, wherein the first input comprises a number of times the first input has been changed.

11. The method of claim 7, wherein the one or more characteristics of the protected signal comprise a key.

12. The method of claim 7, wherein at least one of the one or more characteristics of the protected signal and the one or more characteristics of the stored signal can be changed randomly.

13. The method of claim 7, wherein at least one of the one or more characteristics of the protected signal and the one or more characteristics of the stored signal can be changed pseudo-randomly.

14. The method of claim 7, further comprising changing at least one of the protected signal and the stored signal based at least in part on a number of times the receiving unit has received one or more protected signals.

15. The method of claim 1, further comprising:

electronically linking the receiving unit to the portable transmitter, wherein the linking is based at least in part on a proximity of the receiving unit and the portable transmitter.

16. An apparatus for operating a security system, comprising:

a receiving unit having a receiver in communication with a security system panel;

at least one processor;

memory in electronic communication with the at least one processor; and instructions stored in the memory, the instructions being executable by the at least one processor to:

receive at the receiving unit a protected signal sent from a portable transmitter, wherein the protected signal comprises an authentication signal having a secret;

assess at least one characteristic of the protected signal;

modify at least one characteristic of the protected signal based at least in part on the assessing, wherein the modification of the protected signal comprises authenticating the authentication signal, and wherein the authentication signal comprises a hash;

compare, at the receiving unit, the protected signal to a stored signal after the modifying, wherein comparing the protected signal to the stored signal comprises determining whether at least one packet of the protected signal is valid; and transmit, to the portable transmitter, an indication of whether the protected signal is valid based at least in part on comparing the protected signal to the stored signal, wherein the indication comprises a signal to enter a security mode based at least in part on determining that the at least one packet of the protected signal is invalid.

17. A non-transitory computer-readable storage medium storing computer executable instructions that when executed by a processor cause the processor to:

receive at a receiving unit a protected signal sent from a portable transmitter, wherein the protected signal comprises an authentication signal having a secret;

assess at least one characteristic of the protected signal;

modify at least one characteristic of the protected signal based at least in part on the assessing, wherein the modification of the protected signal comprises authenticating the authentication signal, and wherein the authentication signal comprises a hash;

compare, at the receiving unit, the protected signal to a stored signal after the modifying, wherein comparing the protected signal to the stored signal comprises determining whether at least one packet of the protected signal is valid; and transmit, to the portable transmitter, an indication of whether the protected signal is valid based at least in part on comparing the protected signal to the stored signal, wherein the indication comprises a signal to enter a security mode based at least in part on determining that the at least one packet of the protected signal is invalid.

18. The non-transitory computer-readable storage medium of claim 17, the computer executable instructions further comprising changing one or more characteristics of the protected signal based at least in part on a number of events, wherein the protected signal comprises an encrypted signal having a key.

19. The apparatus for operating a security system of claim 16, wherein the protected signal comprises an encrypted signal having a key.

20. The apparatus for operating a security system of claim 19, wherein modifying the protected signal comprises decrypting the encrypted signal.

21. The apparatus for operating a security system of claim 16, wherein the portable transmitter comprises a key fob.

22. The apparatus for operating a security system of claim 16, the instructions being executable by the at least one processor to:

change one or more characteristics of the protected signal based at least in part on a first input; or change one or more characteristics of the stored signal based at least in part on the first input; or both.

23. The apparatus for operating a security system of claim 22, wherein the first input comprises a user input, a number of times the user input has been received, a number of times the first input has been changed, or a combination thereof.

24. The non-transitory computer-readable storage medium of claim 18, wherein at least one of the number of events comprises a user input, or a number of times the user input has been received, or both.

25. The non-transitory computer-readable storage medium of claim 18, wherein the one or more characteristics of the protected signal comprise a key.

\* \* \* \* \*